UNITED STATES PATENT OFFICE.

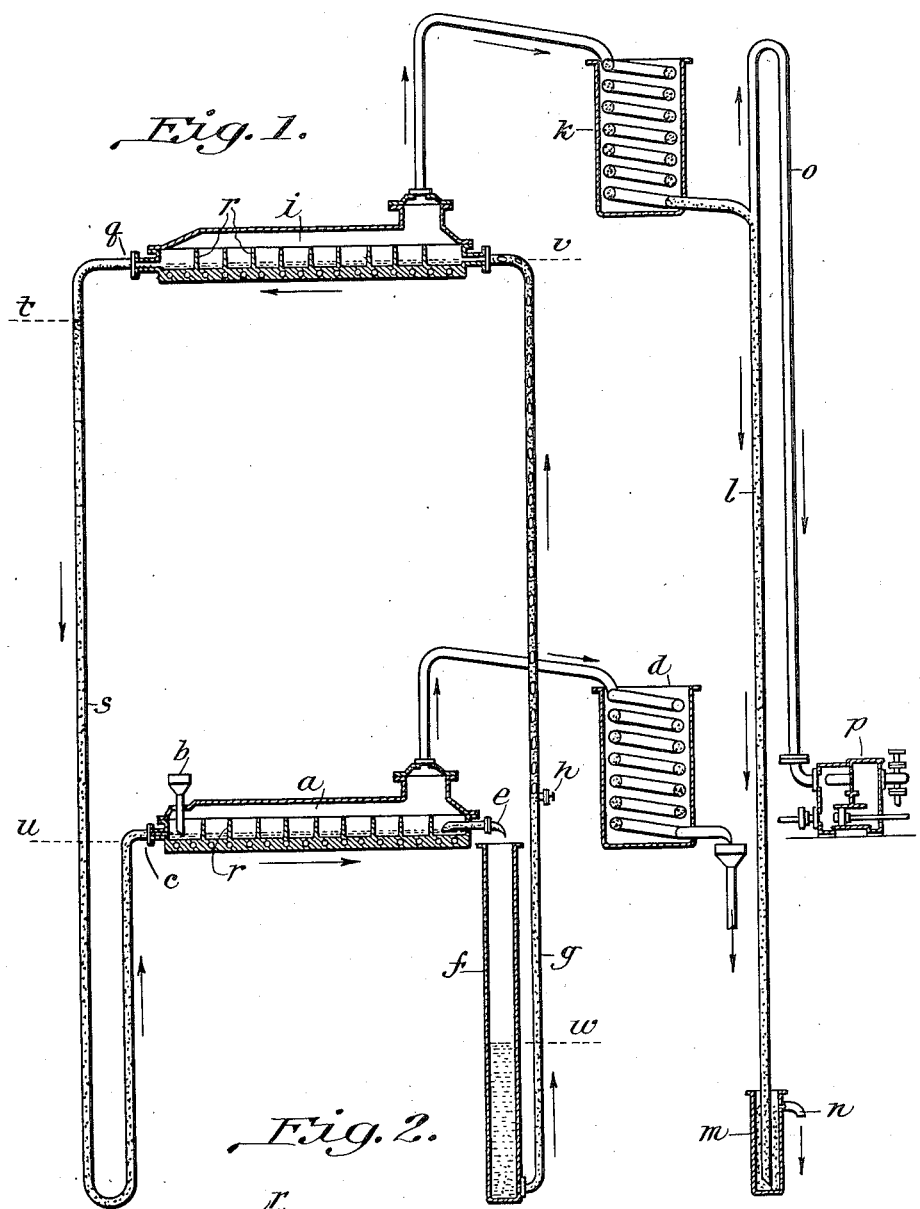

FRITZ RASCHIG, OF LUDWIGSHAFEN-ON-THE-RHINE, GERMANY.

PROCESS AND APPARATUS FOR CONCENTRATING DILUTE NITRIC ACID.

1,163,174.     Specification of Letters Patent.     Patented Dec. 7, 1915.

Application filed February 9, 1915. Serial No. 7,156.

*To all whom it may concern:*

Be it known that I, FRITZ RASCHIG, doctor of philosophy, chemist, a citizen of the German Empire, residing at Ludwigshafen-on-the-Rhine, Germany, have invented new and useful Improvements in Processes and Apparatus for Concentrating Dilute Nitric Acid, of which the following is a specification.

This invention relates to a process and apparatus for concentrating dilute nitric acid in a continuous manner; and it comprises, as a process, a process of continuously flowing a mixture of dilute nitric and concentrated sulfuric acids through a suitable distilling apparatus and distilling the same, advantageously under atmospheric pressure and at a temperature of about 150° C., to give concentrated nitric acid vapors which are condensed and dilute sulfuric acid, continuously supplying the resulting dilute sulfuric acid to a concentrating apparatus and concentrating the same by distillation at a suitable temperature which may be the same as that of the first step (about 150° C). and under a high vacuum, and mixing the resulting concentrated sulfuric acid with further amounts of dilute nitric acid for use in the first step of the process; and as an apparatus it comprises a distilling pan or apparatus through which such a mixture of dilute nitric and concentrated sulfuric acids can be flowed in a continuous manner and heated to a temperature of *e. g.*, 150° C. by steam coils, means for introducing dilute nitric acid, means for raising the dilute acid flowing therefrom to a second evaporating pan maintained under a high vacuum, means for connecting the outlet of said second pan to permit flow of concentrated sulfuric acid therebetween, and means for removing the distillate from said pans and for maintaining a suitable vacuum in said second pan; and it further comprises certain other features of construction and operation; all as more fully hereinafter set forth and as claimed.

In the manufacture of nitric acid from air or by the oxidation of ammonia, nitrous gases are obtained which are cooled and absorbed in towers through which water flows. A dilute nitric acid is obtained from these towers which, by recirculation and further absorption of the nitrous gases, can be concentrated to an acid of about 50% $HNO_3$. A more concentrated acid cannot be obtained in this manner. Moreover, further concentration by evaporation is not possible. But since nitric acid is for the most part used in a concentrated form, a simple and continuous process of concentration is desirable. Heretofore it has been proposed to distill dilute nitric acid with concentrated sulfuric acid, strong nitric and dilute sulfuric acids being thus obtained, the dilute sulfuric acid being subsequently concentrated and again used. Such processes, however, are expensive and complicated and require constant and careful supervision and expensive apparatus such as acid pumps, evaporating apparatus heated by hot nitrous gases, etc.

It is the object of the present invention to provide an improved process and apparatus whereby the concentration of the nitric acid by distillation of a mixture of dilute nitric and concentrated sulfuric acids and the subsequent concentration of the dilute sulfuric acid are effected in a simple and continuous manner, which is entirely automatic and requires no acid pump or heating vapors, and which works with steam alone as the source of heat.

The process and apparatus will be more particularly described in connection with the accompanying drawing, illustrating one embodiment of the invention, in which—

Figure 1 shows somewhat diagrammatically one form of apparatus embodying the invention; and Fig. 2 is a top view of the upper distillation apparatus with its cover removed.

The apparatus illustrated is made up of a cast iron pan *a*, having a steam coil cast therein, lined with lead and having a cast iron cover through which the inlet funnel *b* projects, and having a suitable inlet at *c* and outlet at *e* for liquid and an outlet for vapors leading to the condensing coil *d*. A suitable receptacle *f* receives the outflow and communicates through pipe *g* with the pan *i* similar to the pan *a*, and provided with an outlet at *q* into the pipe *s* which leads to the inlet *c*. The vapors from the pan *i* are condensed in the clay cooler *k*. A pump *p* maintains through the pipe *o* a high vacuum in the pan *i* and coil *k*, the outlet from this coil being the pipe *l* which discharges into the receptacle *m* provided with overflow *n*. The pipe *o* is so connected as to prevent liquid from entering it, and the length of the pipe *l* is advantageously sufficient to maintain a head of liquid equal to or greater than the vacuum employed whereby back suction by the pump $p$ is precluded.

In the operation of the apparatus, and the carrying out of the process, concentrated sulfuric acid of about 92% $H_2SO_4$ runs into the pan $a$ at $c$ from the the pipe $s$ in an even current, and dilute nitric acid of about 50% strength also runs evenly but in much smaller quantities through the funnel $b$. By means of the steam coil the pan is heated to about 150° C. by steam of about 10 to 12 atmospheres pressure. The mixture of the dilute nitric and concentrated sulfuric acids is caused by the ribs $r$ to follow a labyrinthine course before it is finally discharged at $e$. In the pan $a$ and during this prolonged flow the nitric acid is removed in the form of vapor which is condensed in the clay cooler $d$ and obtained in a highly concentrated form.

The dilute sulfuric acid which leaves the pan $a$ at $e$ runs into the lead vessel $f$ and into the tube $g$ in which it is forced by atmospheric pressure into the vacuum pan $i$ which stands about six meters above the pan $e$. The pan $i$ is also heated by the steam coils to about 150° C., at which temperature and under the influence of the vacuum, the dilute sulfuric acid gives off its water together with some small amounts of nitric acid which are condensed in the clay cooler $k$ to form very dilute nitric acid, which escapes through the pipe $l$. This dilute nitric acid can be used again in the absorption towers for absorbing nitrous gases and thus concentrated to about 50% nitric acid ready for further concentration by the process of the present invention.

The concentrated sulfuric acid leaves the pan $i$ at $q$ and enters the descending pipe $s$ where automatically the column of sulfuric acid $t$—$u$ balances itself with the vacuum in the pan $i$. As fast as the concentrated acid flows out of the pan $i$ at $q$ it flows into the pan $a$ at $c$. It is obvious that the same air pressure or vacuum which supports or balances the column of acid $t$—$u$ is not capable of raising the considerably longer column $v$—$w$ in the pipe $g$, even though this last column is of more dilute and therefore lighter liquid. In the regular operation of the process this column becomes still lighter because the ascending hot dilute acid begins to boil as it rises in the pipe and the pressure decreases, so that frequent vapor bubbles are formed and assist in raising the liquid. If this raising action is not sufficient to insure the circulation, as when the process is first started or interrupted, it is possible to admit a small quantity of air by opening the small screw valve $h$ in the pipe $g$. This valve is above the level of the pan $a$ and therefore the head of liquid in the pipe $g$ above this valve more readily rises when air is admitted. Air thus admitted rises in the form of bubbles which become larger as they rise and the pressure decreases, so that the effective column of acid $v$—$w$ is shortened and lightened and circulation thereof insured. Thus the air pressure together with the vacuum insures a continuous supply of the acid from the receptacle $f$ to the pan $i$.

With a pan of 1½ by 3 meters, or 4½ square meters area, it is possible to evaporate hourly about 500 kilo of nitric acid, and from the pan $i$ of the same size about 500 kilo of water hourly. It is in this case necessary to run into the funnel $b$ every hour 1,000 kilo of 50% nitric acid and at $c$ hourly 2,000 kilo of concentrated sulfuric acid which becomes diluted in pan $a$ to an acid of about 60% $H_2SO_4$, and is again concentrated to about 92% acid in pan $i$.

Spent acids, resulting from the manufacture of nitrocellulose by treatment of cotton with a mixture of concentrated nitric and sulfuric acids, can be advantageously concentrated by the process of the present invention. Such acids contain considerable quantities of nitric acid as well as sulfuric acid and water. If this spent acid is introduced at $b$ into the concentrated sulfuric acid, the process proceeds in substantially the same manner, the concentrated nitric acid being obtained at $d$ and the water with small amounts of nitric acid at $n$. Since sulfuric acid is being continually introduced with the spent acid it is necessary to remove a corresponding amount of concentrated acid in order to prevent the acid from rising higher in the vessel $f$ and overflowing. This concentrated acid is drawn off at $c$ (by means not shown) in a regular current, the automatic operation of the process being thus maintained. Such spent acids sometimes contain nitrous acid as well as nitric acid. This nitrous acid would for the most part be driven off in the form of vapor with the concentrated nitric acid and would be condensed or escape as gas from the coil $d$. Some of it might, however, remain dissolved as nitro-sulfonic acid $NO_2SO_3H$ in the sulfuric acid and would remain combined with it even under the influence of the vacuum in the pan $i$. If this nitro-sulfonic acid should continue to circulate undecomposed and its quantity increase it might increase in amount sufficiently to interfere with the regular operation of the process. In such cases it is necessary to oxidize it to form nitric and sulfuric acids. The oxidizing agents should not introduce impurities. As suitable agents may be used hydrogen peroxid, or Caro's acid, monosulfoper acid ($H_2SO_5$), which is easily obtained by electrolysis of dilute sulfuric acid. If, therefore, the formation of nitrosulfonic acid requires its removal, a small quantity of the hydrogen peroxid or Caro's acid can be admitted in a regular stream at $b$, together with the dilute nitric acid or the spent acid.

It will be seen that the process is a continuous one which requires merely the operation of the vacuum pump $p$ and the supply of steam for heating. The dilute nitric acid is continually supplied and the concentrated nitric acid and water are continually removed in other parts of the apparatus. The sulfuric acid is used repeatedly to deprive the dilute nitric acid of its water and is repeatedly and continually concentrated. The circulation is effected by the suction of the vacuum acting on the column of liquid in the pipe $g$ assisted by the action of the air of vapors rising in this pipe. The vacuum in the pan $i$ corresponds to the heads of liquids $t$—$u$ and $v$—$w$. It will be obvious that variations and modifications can be made in the process and apparatus illustrated and described without departing from the spirit and scope of the invention as set forth in the accompanying claims.

I claim:

1. The continuous process of concentrating dilute nitric acid which comprises continuously flowing a mixture if dilute nitric and concentrated sulfuric acids into a suitable distilling apparatus and distilling the same to give concentrated nitric acid vapors and dilute sulfuric acid, continuously supplying the resulting dilute sulfuric acid to a concentrating apparatus, and concentrating the same by distillation under a vacuum sufficiently high to cause the flow of sulfuric acid from the distilling apparatus to the concentrating apparatus and to yet permit the resulting concentrated sulfuric acid to flow back to the distilling apparatus, and mixing the resulting concentrated sulfuric acid with further amounts of dilute nitric acid for use in the first step of the process, substantially as described.

2. The continuous process of concentrating dilute nitric acid which comprises continuously flowing a mixture of dilute nitric and concentrated sulfuric acids into a suitable distilling apparatus and distilling the same at atmospheric pressure and at a temperature of about 150° C. to give concentrated nitric acid vapors and dilute sulfuric acid, continuously supplying the resulting dilute sulfuric acid to a concentrating apparatus, and concentrating the same by distillation at a temperature of about 150° C. and under a high vacuum, and mixing the resulting concentrated sulfuric acid with further amounts of dilute nitric acid for use in the first step of the process, substantially as described.

3. The continuous process of concentrating dilute nitric acid which comprises continuously flowing a mixture of about one part 50% nitric acid and about two parts of sulfuric acid of about 92% strength into a suitable distilling apparatus and distilling the same at atmospheric pressure and at a temperature of about 150° C. to give concentrated nitric acid vapors and dilute sulfuric acid of about 60% strength, continuously supplying the resulting dilute sulfuric acid to a concentrating apparatus, and concentrating the same by distillation at a temperature of about 150° C. and under a high vacuum to give concentrated sulfuric acid of about 92% strength, and mixing the resulting concentrated sulfuric acid with further amounts of dilute nitric acid for use in the first step of the process, substantially as described.

4. An apparatus for the continuous concentration of dilute nitric acid comprising a distilling pan for distilling a mixture of nitric and sulfuric acids, an evaporating pan for concentrating dilute sulfuric acid, means for maintaining said last mentioned pan under a vacuum and for condensing the distillate therefrom, means for conveying concentrated sulfuric acid from said concentrating to said distilling pan and for introducing nitric acid into said pan, and means for condensing the distillate from said distilling pan and for circulating the dilute acid from said pan to said evaporating pan, substantially as described.

5. An apparatus for continuous distillation of dilute nitric acid comprising a distilling pan having a condensing coil for distilled vapors and having suitable inlets and outlets for liquids, an evaporating pan above said distilling pan having a condensing coil for distilled vapors and having suitable inlets and outlets, a pipe connection between the outlet of said evaporating pan and the inlet of said distilling pan, a receptacle arranged to receive the outflow from said distilling pan and having a pipe connection with the inlet of said evaporating pan, means for maintaining a vacuum in said means for maintaining a vacuum in said evaporating pan, and means for effecting circulation from said receptacle to said evaporating pan, substantially as described.

In testimony whereof, I have hereunto set my hand in the presence of two subscribing witnesses.

Dr. FRITZ RASCHIG.

Witnesses:
J. Deuschel,
Andreas Fleer.